(No Model.)
A. L. RIKER.
SECONDARY BATTERY ELECTRODE.
No. 406,771. Patented July 9, 1889.
FIG. I.
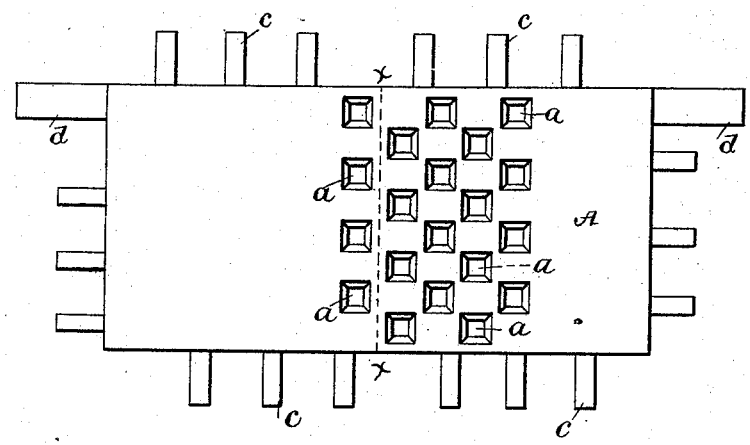
FIG. II.   FIG. III.
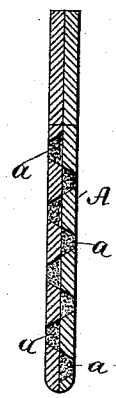 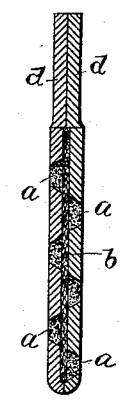
Attest:
Jas. H. McCathran
Philip Mauro
Inventor:
Andrew L. Riker
by
F. Pollok
his attorney

UNITED STATES PATENT OFFICE.

ANDREW L. RIKER, OF NEW YORK, N. Y.

SECONDARY-BATTERY ELECTRODE.

SPECIFICATION forming part of Letters Patent No. 406,771, dated July 9, 1889.

Application filed April 24, 1889. Serial No. 308,349. (No model.)

*To all whom it may concern:*

Be it known that I, ANDREW L. RIKER, of New York city, in the county and State of New York, have invented a new and useful Improvement in Secondary-Battery Elements, which improvement is fully set forth in the following specification.

This invention relates to the construction of elements or plates for secondary batteries, and has particular reference to that form of battery element in which the active material is packed in perforations in a lead or other conducting support.

It has been proposed heretofore to make the holes or cells for active material diminishing in size from one side of the plate to the other, the active material being in the form of a button of conical or equivalent shape, and therefore less likely to fall out of place. This construction of course is serviceable only when the plate is arranged horizontally, or approximately so. It has also been proposed to make the holes of greatest diameter in the middle of the plate and diminishing toward each side thereof, so that the button of active material would be securely held in place. A plate or grid of this form, however, would be extremely difficult to make. It could not be cast, and holes of the shape specified could be cut only with greatest difficulty.

According to the present invention a plate or grid of lead or other suitable material is cast or otherwise formed with holes or cells having greater area on one side of the plate than on the other, and these cells are packed or filled with active material, such as peroxide of lead. The plate is then folded on itself in such manner that the large ends of the holes are inside—that is, adjacent to each other—and the small ends outward. Thus the button of active material is supported at the side on which it would be likely to fall out.

The invention will be fully understood by reference to the accompanying drawings, in which—

Figure I illustrates in plan a plate or grid before its cells are filled with active material. Fig. II illustrates in section the plate after being folded, and Fig. III is a similar view showing a layer of absorbent material interposed between the two leaves of the plate.

The plate A is cast (or otherwise formed) with a series of cells or holes $a$, which may be square, as shown, or of other suitable shape in cross-section, this being immaterial provided the area of the cells at one side of the plate is less than at the other. The plate is also provided with ears or strips $c$, projecting from its edges, (which ears or strips may be integral with the plate or otherwise,) and with larger projections $d$ to serve as terminals for connection of the battery-wires. The cells being filled with active material, the plate is folded as on the line $x\ x$, being bent so that those surfaces which contain the large ends of cells $a$ approach each other. The two leaves are then bound together by bending over the ears or strips $c$. The position of the folded plate is shown in Fig. II. The cells could be so disposed that when the plate is folded they will register with each other. It is preferred, however, to fold the plate as shown, so that each cell is closed or partially closed at its large end by the solid portion of the plate. This gives a larger extent of contact between the active material and its conducting support and furnishes additional security against the washing out of the active material. When made in this way the element is practically a cellular plate in which the cells or pockets extend only partly through the same.

If it be desired to provide more perfect access of the electrotype to the active material stored in the cells, a sheet $b$ of absorbent material—such as asbestus paper, felt, or the like—may be folded between the two leaves of the plate, as shown in Fig. III.

I claim as my invention—

1. The method of preparing a secondary element, which method consists in forming a plate or support of conductive material with cells or holes decreasing in diameter from one side to the other, filling such cells with active material, and then folding the plate upon itself in such manner that the smaller ends of the holes are outside, substantially as described.

2. The method of preparing a battery element, which method consists in forming a plate of lead or other material with tapering cells or holes, filling such cells or holes with active material, and then folding said plate on a line such that the large end of the cells will be opposite to a solid part of the plate, substantially as described.

3. The method of preparing a battery element, which method consists in forming a plate with tapering cells or holes, filling the same with active material, and folding the plate upon itself with a sheet of absorptive material interposed between the two leaves, the fold being so made that the small ends of the cells or holes are outside, substantially as described.

4. The method of preparing a battery element by forming a plate with tapering holes and projecting strips or ears, filling the holes with active material, folding the plate upon itself, and clamping the two leaves together by overlapping the strips or ears, substantially as described.

5. A secondary-battery element consisting of a folded plate or support having holes or cells of larger area on one side of the plate than on the other, said holes or cells being filled with active material and the smaller ends of said cells being outside, substantially as described.

6. A secondary-battery element consisting of a doubled or folded plate provided with tapering holes filled with active material, the smaller ends of said holes being outside, and a sheet of absorbent material interposed between said holes, substantially as described.

7. A secondary-battery element consisting of a doubled or folded plate having cells filled with active material, the two leaves of said element being bound together by overlapping strips or ears at the edges of the plate, substantially as described.

In testimony whereof I have signed this specification in the presence of two subscribing witnesses.

ANDREW L. RIKER.

Witnesses:
PHILIP MAURO,
CHARLES J. HEDRICK.